United States Patent [19]

Olin et al.

[11] 4,162,605

[45] Jul. 31, 1979

[54] REAR WHEEL SUPPORT APPARATUS FOR A THREE WHEEL VEHICLE

[75] Inventors: Paul H. Olin, Bloomington; David J. Scherbring, Edina, both of Minn.

[73] Assignee: The Toro Company, Minneapolis, Minn.

[21] Appl. No.: 875,755

[22] Filed: Feb. 7, 1978

[51] Int. Cl.² ............................................. A01D 35/24
[52] U.S. Cl. ............................. 56/7; 56/11.8; 56/11.9; 180/211; 280/270
[58] Field of Search ............ 56/7, 6, 13.6, 13.7, 56/11.8, 11.9; 180/26 A, 26 R, 186.48, 186.66; 280/92, 270

[56] References Cited

U.S. PATENT DOCUMENTS

| 3,599,408 | 8/1971 | Craven | 180/26 R |
| 3,702,051 | 11/1972 | Deines | 56/11.8 |

*Primary Examiner*—Jay N. Eskovitz
*Attorney, Agent, or Firm*—Merchant, Gould, Smith, Edell, Welter & Schmidt

[57] ABSTRACT

An improved wheel support apparatus for a mowing machine of the type having a body movably supported by three drive wheels, one of which is a steerable drive wheel. The wheel support apparatus includes a sleeve fixed to the body and a bracket member carried on the steerable drive wheel. The bracket member carries an upwardly extending spindle which is rotatably received inside the sleeve. The spindle and the sleeve are angularly oriented relative to a vertical axis through the drive wheel such that rotation of the drive wheel from its straight ahead position raises the body of the mowing machine upwardly a small distance. When the turn is completed, the weight of the body bears down on the wheel support apparatus to self-correct the wheel to its normal straight ahead position regardless of the direction in which the mowing machine is moving. In addition, the wheel support apparatus is mounted to one side and substantially below the upper surface of the steerable drive wheel to decrease the side profile of the mowing machine.

10 Claims, 10 Drawing Figures

REAR WHEEL SUPPORT APPARATUS FOR A THREE WHEEL VEHICLE

BACKGROUND OF THE INVENTION

1. Field of the Invention

This invention relates generally to an improved self-propelled grass mowing machine of the tri-plex type having a plurality of cutting units (e.g., three cutting units). Such a machine includes a powered body or traction unit which carries an operator who drives and controls the machine. More particularly, this invention relates to the pivot structure for the steerable drive wheel of such a mowing machine.

2. Description of the Prior Art

Grass is a widely used ground cover for both private and public property. However, grass covered areas are sometimes very large which presents difficult problems in keeping the grass properly mowed. It is not uncommon for cemeteries, golf courses, parks, highway median strips, and the like to extend over many acres of land and to be wholly or partially covered by grass. Such large areas usually are not capable of being efficiently mowed by "small scale" or household grass cutting equipment, such as a hand pushed walk-behind lawn mower. Furthermore, at least some of these large grass covered areas must be frequently mowed. For example, the grass on a golf course or cemetery must be mowed as often as once a week or more, especially during the height of the grass growing season. This further dictates against the use of small scale lawn mowing equipment. If such equipment were used to cut such large areas, it would require a large number of lawn mowing machines and a relatively large labor force to keep the grass adequately mowed. This would make the cutting of these grassy areas extremely expensive.

Various self-propelled "large scale" mowing machines have been designed to more efficiently cut large areas of land covered by grass. One general type of such a mowing machine is that known in the industry as a tri-plex machine. The tri-plex machine is a self-propelled mowing machine of the rider type (i.e., one which carries an operator) having an internal combustion engine as the basic power source. The machine comprises a frame or body member which is movably supported by a plurality of drive wheels. Three drive wheels arranged in a triangular relationship are sometimes used. In addition, the body of the tri-plex mowing machine usually supports three cutting units which are vertically movable into and out of engagement with the ground. Each of the cutting units comprises a rotatable reel type blade which sweeps the grass against a fixed bed knife to cut the grass. The drive for the cutting units and the drive wheels is usually taken off the internal combustion engine by generally conventional power transmission systems (e.g., mechanical belt drives and the like).

When a three wheeled arrangement is used to support the body of the grass mowing machine, the unopposed third drive wheel (e.g., the rear drive wheel) is often a steerable drive wheel. Referring to FIGS. 9 and 10, it is conventional to support the rear drive wheel 100 of the mowing machine in a clevice support block 101. Clevice block 101 is U-shaped having two opposed side plates 102 and 103 and a top plate 104. The opposed side plates 102 and 103 rotatably receive the axle 105 of the drive wheel 100. Top plate 104 carries an upwardly extending cylindrical spindle 106. Spindle 106 is rotatably received in a sleeve rigidly mounted on the body of the mowing machine to journal the drive wheel for rotation about a vertical axis. This type of support arrangement for the steerable drive wheel 100 is generally similar to the support arrangements of conventional caster wheels on various types of commonly known household goods, e.g. the caster wheels used to movably mount furniture and the like. Thus, the prior art method of supporting the rear drive wheel in a mowing machine will be generally referred to as the caster method and the steerable rear drive wheel 100 as the caster wheel.

Although the use of a caster wheel as the steerable drive wheel adequately supports the mowing machine in most situations, certain problems are nonetheless presented by this type of support arrangement. Spindle 106 extends vertically relative to the top plate 104 of the clevice block 101. In addition, the side plates 102 and 103 of the clevice block 101 must be long enough such that the top plate 104 itself clears the upper surface of the drive wheel 100. Thus, the height above ground level of the clevice block 108 and the attached spindle 106, which will be referred to as $y_1$ for clevice block 101, is often quite large. This requires that the body of the mowing machine have a hump or otherwise be suitably enlarged to accomodate the vertical height $y_1$ of the drive wheel support apparatus. This increase in the height of the mowing machine means that extra material is needed to manufacture the machine, thereby increasing its manufacturing costs and purchase price. In addition, the use of a hump on the body or an enlarged body frame to enclose the wheel support apparatus detracts from a sleek profile of the mowing machine and to at least some people is not aesthetically pleasing.

Another problem often associated with caster type drive wheels 100 is their ability to self correct in only one direction of movement of the mowing machine. This is best illustrated when considering the movement of the mowing machine into and through a turn. When the operator of the mowing machine desires to change the direction of movement of the machine, he turns the steering wheel which rotates the steerable drive wheel 100 about the axis of the support spindle 106. After the turn is completed, the operator releases the steering wheel. It is desired at that time that the drive wheel 100 self correct or move back to its normal or straight ahead position. When the mowing machine is being driven in a forward direction, most prior art caster wheels 100 will self correct to the desired position. However, when the machine is being in a reverse direction, caster wheels 100 often do not self correct. Instead, the caster wheels will remain rotated from their normal position which causes the mowing machine to keep turning even after the steering wheel is released. In some instances, the caster wheels may even rotate further about the support spindle to increase the turn of the mowing machine.

The inability of a caster type steerable drive wheel to self correct when the mowing machine or vehicle is being driven in a reverse direction is generally disadvantageous. For one thing, it does not allow proper operation of the mowing machine in the reverse direction. This decreases the flexibility of the mowing machine. In addition, it may prohibit the operator from backing the machine into restricted spaces because of the operator's inability to precisely control the movement of the vehicle in a reverse direction due to the failure of the steerable drive wheel to self-correct in this direction.

SUMMARY OF THE INVENTION

It is an aspect of this invention to provide a support apparatus for the steerable rear wheel of a three wheel self-propelled mowing machine wherein the support apparatus is compact and does not appreciably increase the height of the mowing machine. Another aspect of this invention is to provide a rear wheel support apparatus for the steerable wheel which tends to self correct the wheel to its normal straight ahead orientation regardless of the direction of movement of the mowing machine.

This invention comprises a rear wheel support apparatus for the steerable rear wheel of a self-propelled mowing machine. The rear wheel support apparatus comprises a mounting or support sleeve fixedly carried on the body of the mowing machine generally adjacent the drive wheel. The drive wheel includes a hub to which the output shaft of a hydraulic motor is attached. The housing of the hydraulic motor is connected or secured to a bracket member having a generally upright cylindrical spindle. The spindle is received in the sleeve to rotatably journal the entire drive wheel about the axis of rotation defined by the axis of the spindle. Both the sleeve and the spindle are angularly offset or oriented relative to a vertical axis through the center of the wheel. Thus, rotation of the drive wheel about the axis of the spindle tends to move the body of the mowing machine upwardly. However, the weight of the body bears down on the drive wheel to cause the drive wheel to self correct when a steering mechanism is released regardless of the direction of movement of the machine. In addition, the sleeve and the spindle have a major portion of their length below the upper surface of the drive wheel to minimize the side elevational profile of the mowing machine.

BRIEF DESCRIPTION OF THE DRAWINGS

This invention will be described hereafter in a Detailed Description, when taken in conjunction with the following figures, in which like reference numerals will refer to like elements throughout.

DETAILED DESCRIPTION

Figure 1:
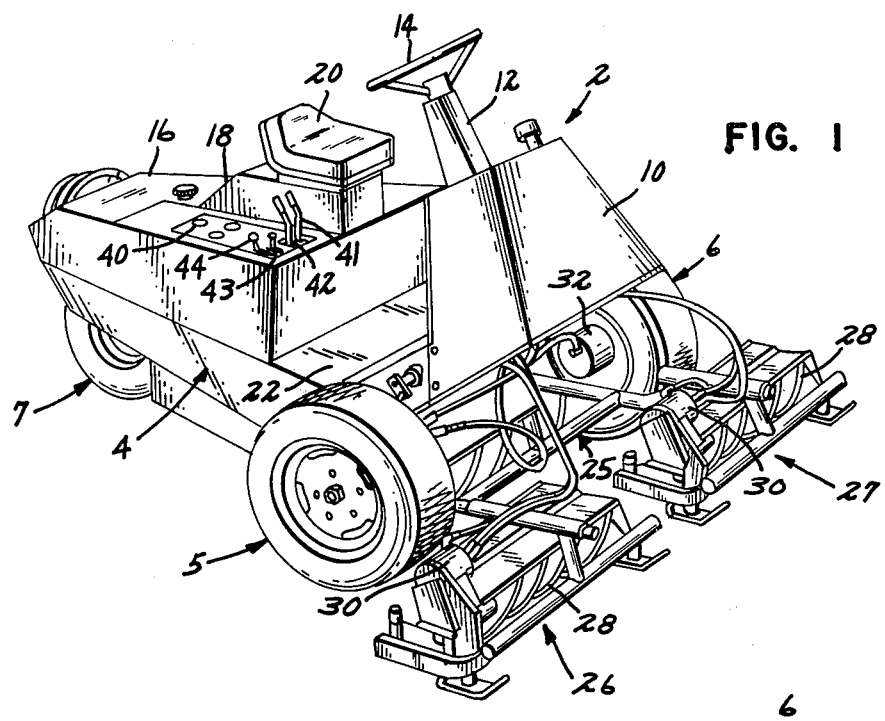
FIG. 1 is a perspective view of an improved self-propelled mowing machine according to the present invention.

Referring first to FIG. 1, an improved self-propelled, rider type mowing machine according to this invention is generally indicated as 2. Mowing machine 2 is particularly suited for cutting or mowing grass and other similar ground cover. More specifically, mowing machine 2 is particularly suited for mowing relatively large areas of grass which may cover many acres of land. Golf courses, cemeteries, and parks are typical examples of the types of areas meant to be mowed by mowing machine 2. Mowing machine 2 is designed to carry an operator who selectively drives and manipulates the mowing machine to cut the grass. Mowing machine 2 as described herein is known as the Turf Pro 84$^{TM}$ Traction Unit manufactured by the Toro Company of Minneapolis, Minnesota. Mowing machine 2 will be described herein insofar as is necessary to a background for and an understanding of the present invention which relates generally to a support apparatus for a steerable drive wheel of mowing machine 2.

Mowing machine 2 comprises a body or frame 4 which is movably supported by three rotatably mounted drive or traction wheels 5, 6, and 7. Two of the drive wheels, i.e. drive wheels 5 and 6, are mounted adjacent the front of body 4 and are placed on opposite sides of body 4 in an opposed relationship. The third drive wheel 7 is placed at the rear of the body 4 and is disposed in a generally triangular relationship to the front drive wheels 5 and 6. Although this triangular wheel arrangement is preferred, other wheel arrangements, including a rectangular orientation of four drive wheels, could be used.

Figure 2:
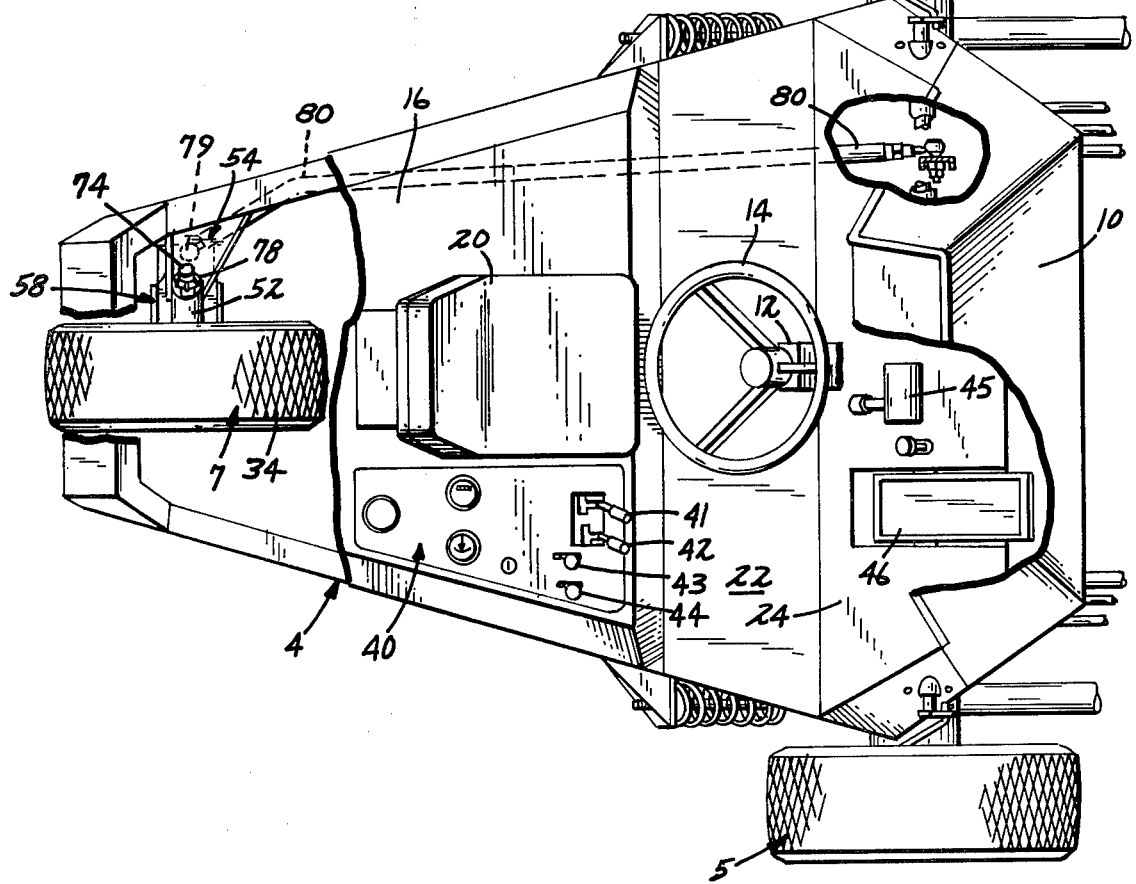
FIG. 2 is a top plan view of the improved mowing machine as shown in FIG. 1, with various portions thereof being broken away to illustrate the interior of the machine.

As shown in FIGS. 1 and 2, the body 4 of mowing machine 2 includes a front shroud 10 having an upwardly extending steering column or tower 12. Steering tower 12 mounts a rotatable steering wheel 14 at its upper end. Steering wheel 14 is located at a position which is generally convenient for selective operation by the operator of mowing machine 2. Body 4 also includes a rear body portion 16 having a pylon or bracket member 18 on its upper surface. Pylon 18 mounts a seat 20 on which the operator sits while driving mowing machine 2. Rear body portion 16 is separated from the front shroud 10 to define a space into which the operator's legs extend as he sits on seat 20. However, rear body portion 16 is connected to front shroud 10 by a floor plate 22 having a slanted front panel 24 attached to the sides of front shroud 10.

Mowing machine 2 carries or mounts a plurality of grass cutting or mowing units. In particular, three cutting units 25, 26, and 27, are mounted on the body 4 of machine 2. Cutting unit 25 is mounted to the underside of body 4 generally underneath the front shroud 10 and floor plate 22. Cutting units 26 and 27 extend outwardly in front of the opposed drive wheels 5 and 6 of body 4 in a cantilever manner as shown in FIG. 1. Cutting units 25-27 are transversely oriented and overlap one another to give a width of cut which is larger than the width of body 4. In this regard, each of the cutting units 25-27 includes a rotatable cutting element comprising reel type rotatable blades 28. Reel blades 28 cooperate with a fixed bedknife (not shown) on each of the cutting units for cutting grass by the coaction between the reel blades 28 and the bedknife as the reel blades are rotated. The number of cutting units used on mowing machine 2 and the specific type of rotatable cutting element used is not critical to the present invention. Thus, fewer than three cutting units could be used and other generally conventional types of cutting devices could be substituted for reel blades 28.

A hydraulic motor 30 is operatively connected by any suitable transmission means (e.g., a chain and sprocket drive) to the reel blades 28 for rotating the same in either a forward or a reverse direction. Rotation of the reel blades 28 in a forward direction cuts the grass while rotation of the blades in a reverse direction is useful for what is known as a backlapping operation. A backlapping operation is one in which the reel blades 28 and bedknife edges are coated with a good medium grade commercial lapping compound in a water soluble carrier. Upon completion of the backlapping operation, the lapping compound can be easily washed away. Such a backlapping operation ensures that the cutting edges are sharp, even and consistent on all of the reel blades 28. In addition, each of the cutting units 25-27 is adapted to be hydraulically raised and lowered out of and into engagement with the ground. When the cutting units 25-27 are in their raised position, mowing machine 2 may be transported from one location to another (e.g., from a storage location to a mowing location). When the cutting units 25-27 are in their lowered positions in engagement with the ground, mowing machine 2 can be driven in a mowing operation.

Figure 4:
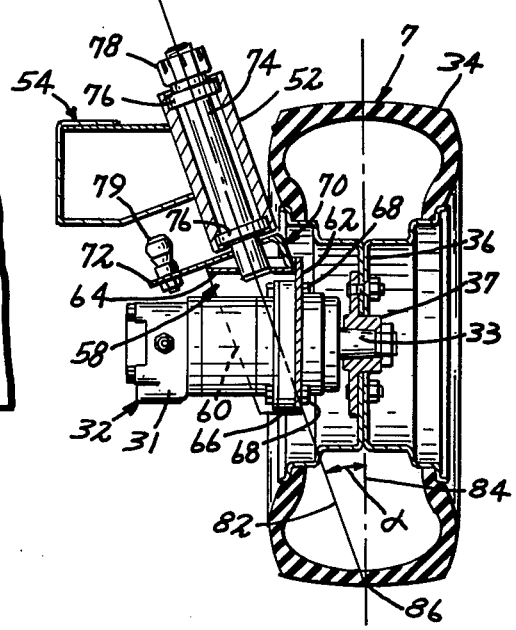
FIG. 4 is a cross-sectional view of the steerable drive wheel and mounting support apparatus shown in FIG. 3.

A hydraulic motor 32 is provided for rotating each of the drive wheels 5-7 either in a forward or reverse direction. Referring to FIG. 4, each drive wheel 5-7 comprises a rubber tire 34 mounted on a rim 36. Rim 36 is releasably attached by conventional lug nuts to a hub 37. Hub 37 is in turn nonrotatably received in a rotatable output shaft 33 of hydraulic motor 32. Although hydraulic motors, such as the motors 30 and 32, are preferred for operating the drive wheels 5-7 and cutting units 25-27 because of low maintenance and high reliability, the specific drive mechanisms are not critical to this invention. Thus, the drive wheels 5-7 and cutting units 25-27 could be operated directly from the power shaft of the internal combustion engine (not shown) of mowing machine 2 through various conventional power transmission members (e.g., drive belts).

An instrument control panel 40 is mounted on body 4 adjacent to the operator's seat 20. Control panel 40 includes a cutting unit lift control 41 for raising and lowering the cutting units 25-27, a mow-backlap control 42 for rotating the cutting units 25-27 in either a mowing or backlapping direction, a choke control 43, and throttle control 44. Throttle control 44 governs the speed of the internal combustion engine (not shown) contained in body 4 which is used as the basic power source for mowing machine 2. Preferably, this engine comprises a twin-cylinder, air-cooled, four-cycle gasoline engine which develops 23 H.P. at 3600 r.p.m. This engine is used to power the hydraulic system of machine 2 and the various hydraulic pumps which then operate the hydraulic motors connected to the traction wheels 5-7 and the cutting units 25-27. In addition, the slanted front panel 24 of floor plate 22 mounts a plurality of foot controls which the operator also uses in driving and controlling mowing machine 2. These controls include a brake pedal 45 and a traction pedal 46. Traction pedal 46 will govern the speed at which mowing machine 2 is driven in conjunction with the engine speed determined by the setting of throttle control 44. Further details of mowing machine 2 and the various components thereof are not necessary to an understanding of the present invention.

Rear drive wheel 7 is steerable (i.e., swingable or rotatable about an axis having a vertical component) to steer or guide mowing machine 2 as it is driven in either a forward or reverse direction. This invention relates to an improved mounting assembly or support apparatus for rotatably journaling and supporting the steerable rear drive wheel 7. This support apparatus is generally indicated as 50 in FIGS. 3 and 4. Support apparatus 50 comprises an elongated cylindrical support sleeve 52. Sleeve 52 is rigidly secured, as by welding, to a mounting member 54 provided on the rear body portion 16. Sleeve 52 and the entire support apparatus 50 is substantially enclosed inside the rear body portion 16 of mowing machine 2 generally adjacent rear drive wheel 7 which is centered in body portion 16 (FIG. 2).

Support apparatus 50 further includes a bracket member generally indicated as 56. Bracket member 56 substantially surrounds the outer housing 31 of hydraulic motor 32. Bracket member 56 comprises a U-shaped support member 58 having two spaced triangular side walls 60 rigidly joined together by a rear wall 62 and a top wall 64. Rear wall 64 is fixedly secured to a flange 66 on motor housing 31 by a plurality of bolts or screws 68. In addition, top wall 64 rigidly mounts an L-shaped bracket 70 between side walls 60. Bracket 70 is welded to top wall 64 and the longest leg 72 of bracket 70 is angularly oriented relative to top wall 64 to define a tilted or slanted support surface.

Bracket member 56 further includes an upwardly extending elongated cylindrical pivot rod or spindle 74. Spindle 74 extends through the support surface 72 of bracket 70 and through top wall 64 and is rigidly secured thereto as by welding. In addition, support surface 72 of bracket 70 has a socket assembly 79 fixedly mounted thereon. As shown in FIG. 2, socket assembly 79 is connected to a steering linkage 80. Steering linkage 80 is operatively connected by a steering transfer assembly (not shown) to steering wheel 14.

Spindle 74 of bracket member 56 is rotatably journaled inside the sleeve 52 by two generally suitable and conventional bearing assemblies 76 at either end of sleeve 52. In addition, the upper end of spindle 74 extends out of the upper end of sleeve 52 and threadedly carries a nut 78. Thus, although spindle 74 is rotatably journaled inside sleeve 52, the longitudinal position of spindle 74 is substantially fixed with regard to the sleeve 52. The longitudinal position of spindle 74 is fixed by the nut 78 at one end of sleeve 52 and by the support surface 72 of L-shaped flange 70 which bears against the bottom of sleeve 52.

Figures 6, 8:
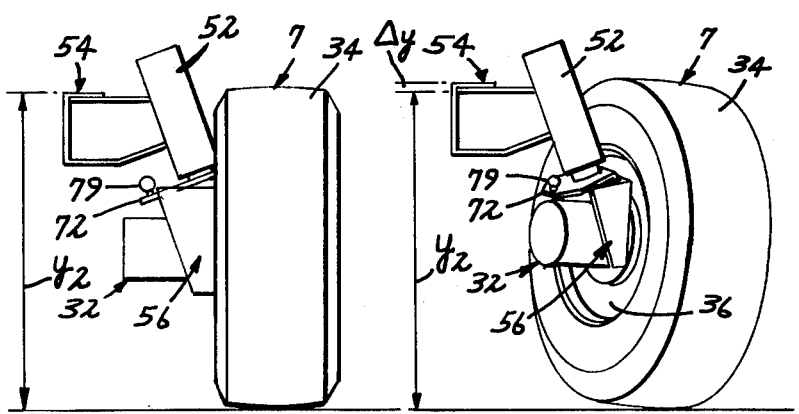
FIG. 6 is a rear elevational view of the steerable drive wheel of FIG. 3 in its FIG. 5 orientation.
FIG. 8 is a rear elevational view of the steerable drive wheel of FIG. 3 in its FIG. 7 orientation.

Referring now to FIGS. 4 and 6, an important feature of this invention is that support sleeve 52 and spindle 74 are angularly offset or oriented relative to the rear steerable drive wheel 7. More particularly, spindle 74 defines an axis of rotation for rear drive wheel 7 which is generally referred to as 82. Rotational axis 82 forms an acute angle referred to as α with a vertical axis 84 passing through the center of drive wheel 7. The angle α is preferably selected so that the axes 82 and 84 intercept one another in the area of contact 86 of drive wheel 7 with the ground when drive wheel 7 is in a normal straight ahead position. The angle α will vary somewhat depending on the diameter of drive wheel 7. Preferably, α will fall in the range of 10°–30°, and is shown in FIG. 4 as being approximately 20°. One way to vary the angle α is to change the angle between the legs of support bracket 70 to change the degree of tilt of support surface 72 on which spindle 74 is mounted.

Figures 5, 7:
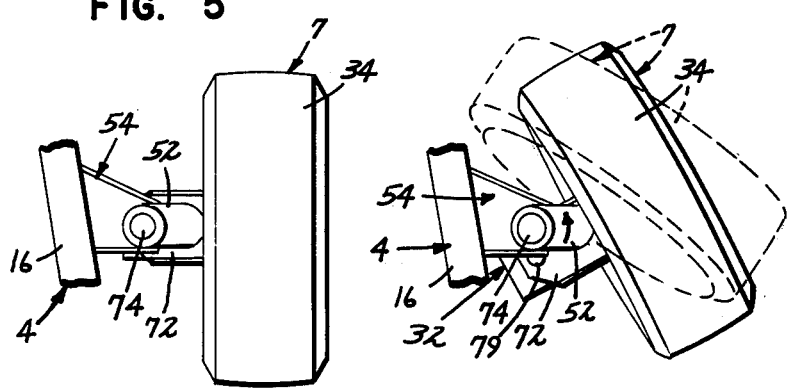
FIG. 5 is a top plan view showing the steerable drive wheel of FIG. 3 in a normal straight ahead orientation relative to the mowing machine.
FIG. 7 is a top plan view showing the steerable drive wheel of FIG. 3 in a rotated or turned position relative to the mowing machine.

The above-described angular orientation of the support apparatus 50 for drive wheel 7 is preferred since it enables the drive wheel 7 to be self-correcting regardless of the direction of movement of mowing machine 2. FIGS. 5-8 illustrate the manner in which this desirable result occurs. Referring first to FIGS. 5 and 6, when a drive wheel 7 is in a normal straight ahead position relative to the body 4 of mowing machine 2, the height of support member 54, and hence body 4, above ground level can be generally referred to as $y_2$. However, as the operator utilizes the steering wheel 14 to selectively turn the drive wheel 7 and the associated support apparatus 50 about the axis of rotation 82, drive wheel 7 does not simply pivot around in contact with the ground as in the case of conventionally mounted steerable drive wheels. Referring then to FIGS. 6 and 7, as the drive wheel 7 is rotated about axis 82, in the direction of the arrow, the drive wheel 7 attempts to tilt or tip down into the ground because of the angular orientation of axis 82. In other words, drive wheel 7 attempts to tilt its forward position down into the ground while the rearward portion of the wheel is lifted out of contact with the ground. However, drive wheel 7 obviously cannot tip downwardly into the ground as the ground is unyielding. Therefore, wheel support apparatus 50 and mounting member 54, and hence the body 4 of mowing machine 2, are forced upwardly a small distance Δy.

As the operator holds the steering wheel 14 to continue the turn of mowing machine 2, the rear portion 16 of body 4 will remain raised by the distance Δy. However, when the turning operation is completed, the operator releases steering wheel 14. Because the rear body portion 16 is raised upwardly by the distance of Δy, the weight of the rear body portion 16 bears downwardly on the support apparatus 50 for the drive wheel 7. This downward force moves the support apparatus 50 downwardly to pivot the drive wheel 7 back around its rotational axis 82 until it reaches its normal straight ahead position as shown in FIGS. 5 and 6. This self-correcting action of drive wheel 7 will occur regardless of the direction in which mowing machine 2 is moving because it is the weight of the mowing machine 2 that acts as the wheel restoring force. That weight is present regardless of the direction of movement of mowing machine 2. Thus, the mounting support apparatus 50 of this invention enables the steerable drive rear wheel 7 to be self-correcting whenever the operator releases the steering wheel 14 after completing a turn in mowing machine 2.

Figure 3:
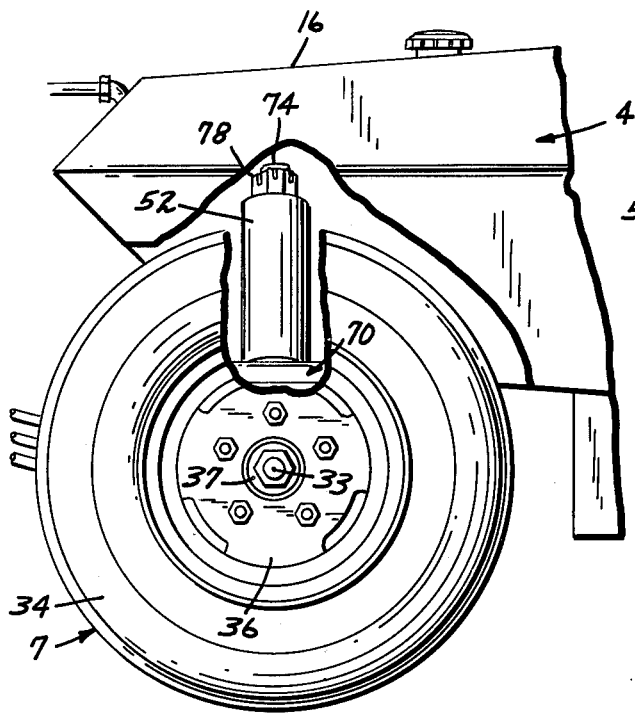
FIG. 3 is a side elevational view, partly broken away, of a steerable drive wheel for the improved mowing machine shown in FIG. 1, specifically illustrating the mounting support apparatus therefor.
Figure 9:
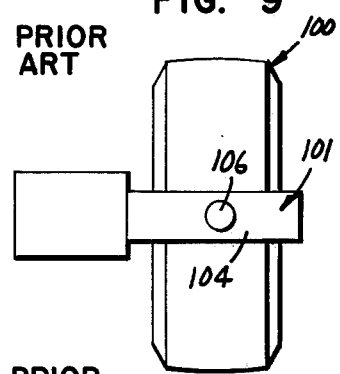
FIG. 9 is a top plan view of a steerable drive wheel and a prior art wheel support apparatus.
Figure 10:
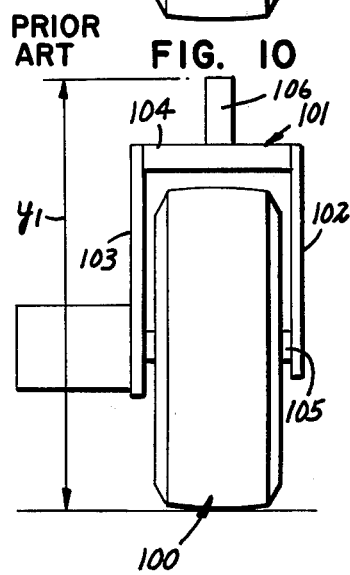
FIG. 10 is a rear elevational view of the prior art wheel support apparatus shown in FIG. 9.

Another important feature of this invention is that support apparatus 50 is located to one side of the rear drive wheel 7 substantially below the upper surface of drive wheel 7. Specifically, both the sleeve 52 and the spindle 74 have a major portion of their length contained below the upper surface of the tire 34 of drive wheel 7. By major portion it is meant at least 50% and preferably greater than 75 % of the length of spindle 74 and sleeve 52. Such a mounting arrangement significantly decreases (e.g., by up to 50%) the height of support apparatus 50 over those wheel supports known in the prior art (e.g., compare the height $y_1$ of the prior art wheel support in FIGS. 9 and 10 to the height $y_2$ of wheel support apparatus 50). Thus, no raised portion or other enlargement of rear body portion 16 is necessary to enclose the wheel support apparatus 50. As shown in FIG. 3, the rear body portion 16 of mowing machine 2 can have a streamlined profile, thus saving space and material over prior art mowing machines.

Various modifications of this invention will be apparent to those skilled in the art. For example, it is not necessary that wheel support apparatus 50 be mounted to one side and substantially below the upper surface of drive wheel 7, although this is preferred. It is only necessary that spindle 74 be angularly oriented relative to a vertical axis through the drive wheel 7 for the drive wheel 7 to be self-correcting in the manner contemplated by this invention. Therefore, the scope of this invention is to be limited only by the appended claims.

What is claimed is:

1. An improved self-propelled mowing machine suitable for cutting grass and the like, which comprises:
   (a) a body;
   (b) three drive wheels rotatably carried on the body for movably supporting the body relative to the ground, two of the drive wheels being located opposite to one another and the third drive wheel being disposed in a triangular relationship relative to the first two drive wheels;
   (c) at least one cutting unit located on the body and suited for engaging the ground to cut the grass; and
   (d) means for pivotably supporting the third drive wheel for steering the body, the supporting means being connected to a selectively operable steering mechanism on the body, the supporting means being further configured such that rotation of the third drive wheel from a normal straight ahead position to a turned position relative to the body tends to move the body upwardly, whereby the weight of the body bears down on the third drive wheel and tends to move the third drive wheel back to its normal straight ahead position when the steering mechanism is released by an operator.

2. An improved self-propelled mowing machine as recited in claim 1, in which the supporting means comprises:
   (a) a sleeve member fixedly carried on the body;
   (b) a bracket member carried on the drive wheel and having an upwardly extending spindle thereon, the spindle being rotatably received inside the sleeve and being substantially longitudinally fixed relative thereto, the spindle defining an axis of rotation about which the steerable third drive wheel is rotatable; and
   (c) wherein both the sleeve and the axis of rotation of the spindle are angularly oriented relative to a vertical axis through the third drive wheel.

3. An improved self-propelled mowing machine as recited in claim 1, wherein the axis of rotation of the spindle intercepts the area of contact of the third drive wheel with the ground when the third drive wheel is in its normal position.

4. An improved self-propelled mowing machine as recited in claim 3, in which the angle formed between the vertical axis and the axis of rotation of the spindle is approximately 20°.

5. An improved self-propelled grass mowing machine of the type having a movable body; a plurality of drive wheels rotatably supported on the body with at least one of the drive wheels comprising a steerable drive wheel; a selectively operable steering mechanism operatively connected to the steerable drive wheel for selectively rotating the steerable drive wheel about an axis of rotation; at least one cutting unit carried on the body and having a rotatable cutting element which is suited for cutting the grass; power means for rotating both the drive wheels and the cutting element in a mowing operation; and wherein the improvement comprises means for mounting the steerable drive wheel such that rotation of the steerable drive wheel from a straight ahead position relative to the body about its axis of rotation moves the body of the mowing machine vertically upwardly, which movement tends to return the steerable drive wheel to its straight ahead position when the steering mechanism is released.

6. An improved self-propelled grass mowing machine as recited in claim 5, in which the steerable wheel mounting means has a major portion of its length positioned to one side of the steerable drive wheel and below an upper surface of the drive wheel thereby decreasing the height of the body of the mowing machine.

7. An improved self-propelled grass mowing machine as recited in claim 6, in which the steerable wheel mounting means comprises:
(a) a bracket member suitably attached to a housing of a drive motor operatively connected to the steerable drive wheel, the bracket member having an upwardly extending spindle which extends at an acute angle relative to a vertical axis through the steerable drive wheel; and
(b) a sleeve fixedly carried on the body for rotatably receiving the spindle, the sleeve also being angularly oriented relative to the vertical axis and having a lower end located closely adjacent the center of the drive wheel and having an upper end projecting a relatively short distance above the upper surface of the steerable drive wheel.

8. An improved self-propelled grass mowing machine as recited in claim 6, in which at least 75% of the length of the steerable wheel mounting means is located below the upper surface of the steerable drive wheel.

9. An improved mowing machine, suitable for cutting a ground cover, which comprises:

(a) a movable body;
(b) a plurality of drive wheels carried on the body and arranged in a triangular relationship with a drive wheel located at an apex of the triangle to form a steerable drive wheel;
(c) a steering mechanism connected to the steerable drive wheel;
(d) motor means for selectively rotating each of the drive wheels in at least a forward direction;
(e) a plurality of cutting units mounted on the body for vertical movement into and out of engagement with the ground cover, the cutting unit including a rotatable cutting element;
(f) powered means for vertically moving the cutting units and for rotating the cutting elements thereof at least in a cutting direction;
(g) mounting means for rotatably supporting the steerable drive wheel on the body, the steerable drive wheel including a hub which is coupled to an output shaft of the motor means, the motor means further including a bracket member having an upwardly extending spindle, the spindle being received inside a sleeve which is fixedly carried on the body, and wherein a major portion of the length of the spindle and the sleeve is located beneath an upper surface of the steerable drive wheel such that the height of the body of the mowing machine may be minimized.

10. An improved self-propelled mowing machine as recited in claim 9, in which the spindle and sleeve of the mounting means extend at an acute angle relative to a vertical axis through the center of the steerable drive wheel, the axis of rotation of the spindle intercepting the vertical axis at approximately the area of contact of the steerable wheel with the ground when the steerable wheel is in a straight ahead position, whereby rotation of the steerable wheel about the spindle will tend to force the body of the machine upwardly to cause the steerable wheel to self correct when the steering mechanism is released.

* * * * *